Nov. 23, 1926.
E. V. RIPPINGILLE
1,607,751
LIQUID LEVEL GAUGE
Filed Nov. 8, 1923     3 Sheets-Sheet 1
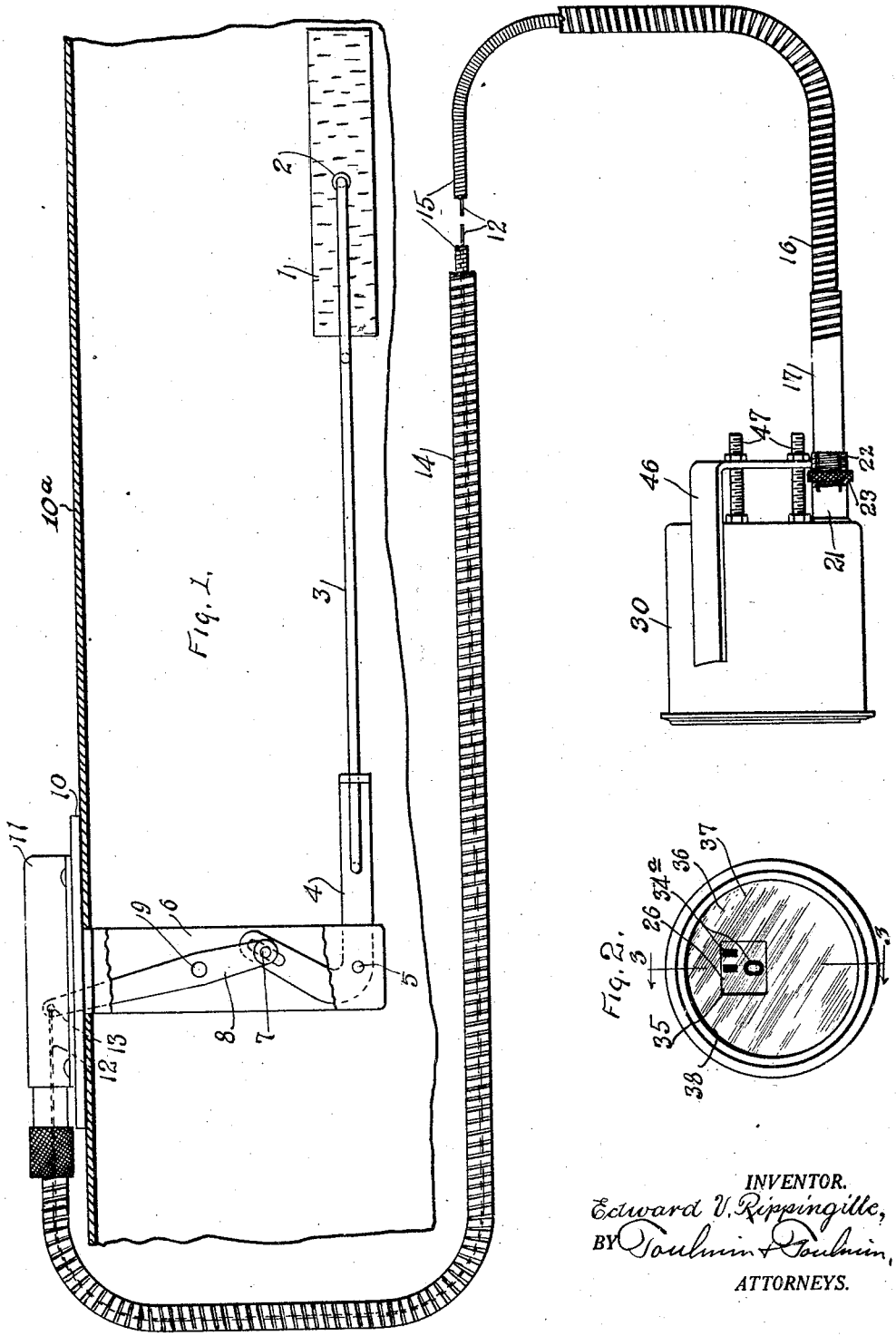
INVENTOR.
Edward V. Rippingille,
BY Toulmin & Toulmin,
ATTORNEYS.

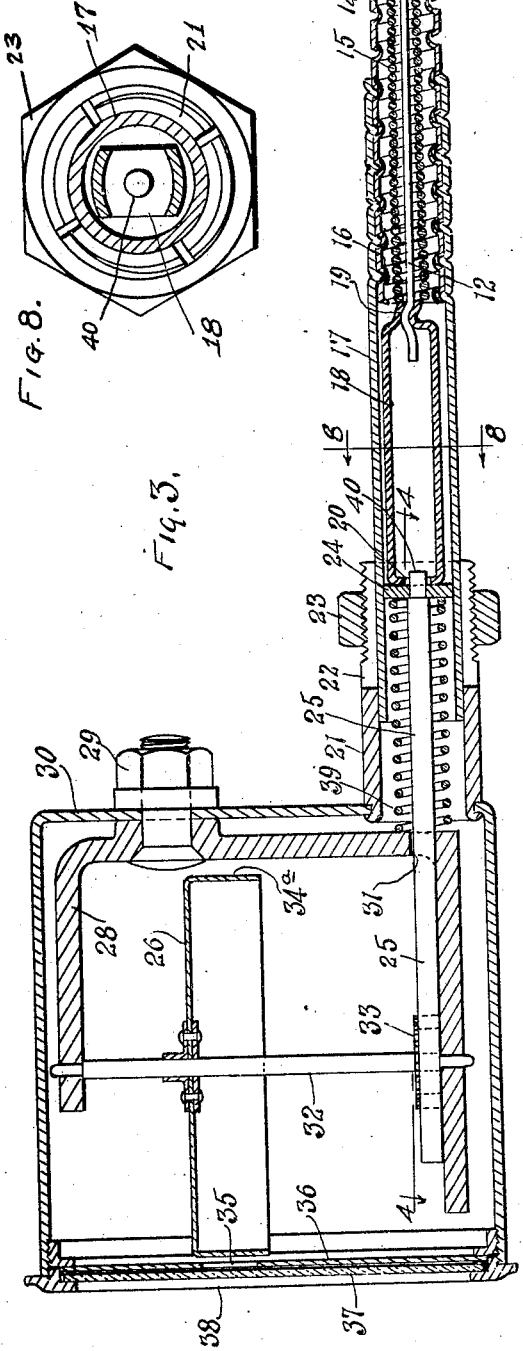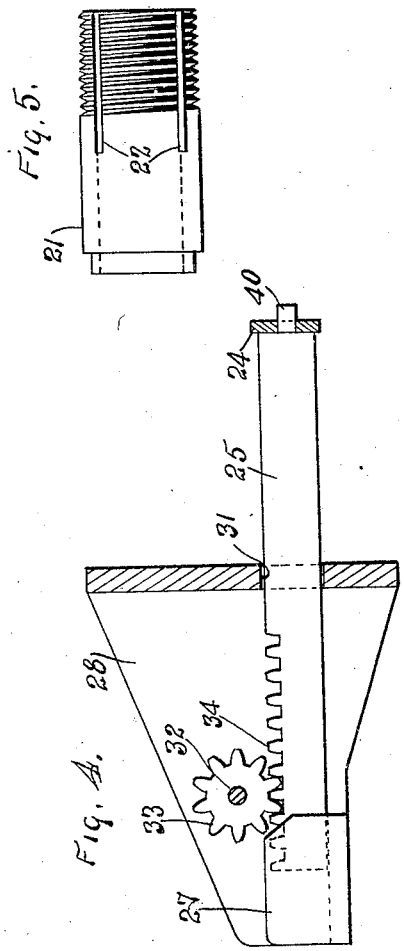

Nov. 23, 1926.
E. V. RIPPINGILLE
LIQUID LEVEL GAUGE
Filed Nov. 8, 1923
1,607,751
3 Sheets-Sheet 3
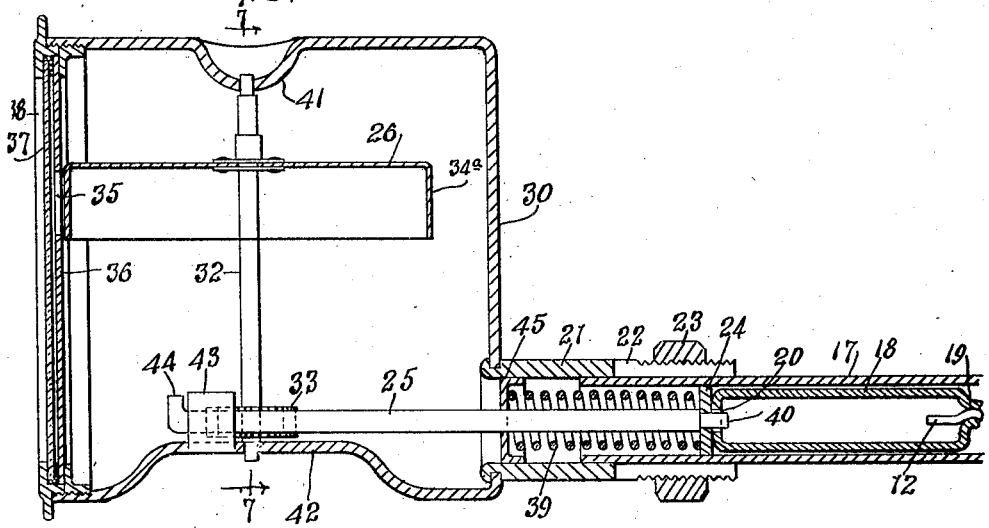
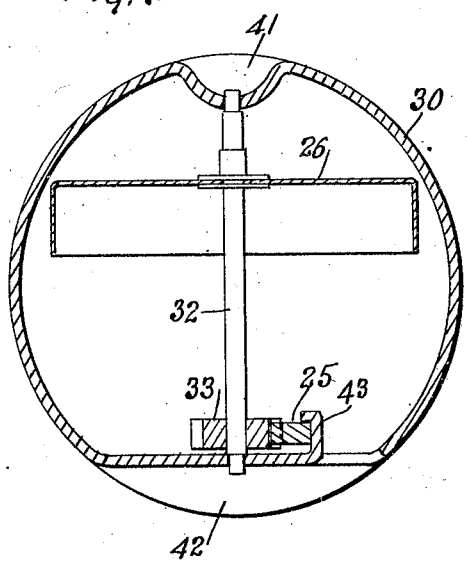
INVENTOR.
Edward V. Rippingille,
BY Toulmin & Toulmin,
ATTORNEYS.

Patented Nov. 23, 1926.

1,607,751

UNITED STATES PATENT OFFICE.

EDWARD V. RIPPINGILLE, OF DETROIT, MICHIGAN, ASSIGNOR TO THE GROLAN MANUFACTURING COMPANY, OF DAYTON, OHIO, A CORPORATION OF DELAWARE.

LIQUID-LEVEL GAUGE.

Application filed November 8, 1923. Serial No. 673,403.

My invention relates to liquid level gauges, and in particular to gauges for measuring the heights of liquids in tanks remotely located from the point of indication.

The object of my invention is to provide a quick and certain means of accurately connecting the indicator head and actuating means to one another without the possibility of the communicating means being damaged.

It is a further object to provide such means of attachment that any unskilled or relatively skilled laborer may make the attachment without the possibility of injury to the delicate communicating means or access to it for purposely tampering therewith.

It is my object to provide a simple adjustment of this character which will also permit of the person installing the equipment to ascertain whether or not the float is on the bottom of the tank, and therefore in zero position, before the indicator is connected which also at the time of connection indicates zero, so that the indicator when connected will accurately indicate the height of the liquid in the tank or the fact that there is no liquid in the tank. As a matter of precaution, it is necessary to ascertain if the wire constituting the communicating means is moving freely and that the float is on the bottom of the tank in zero position. My present invention accomplishes this object and also the object of preventing any injury at any time to the delicate communicating means.

My invention also provides means of ready assembly of the indicator head and also permits of the use of subassemblies which may be economically made by unskilled labor in the factory in order to effect the necessary economies in the production of such apparatus.

It has been found in installing gauges of this character that if the flexible communicating means, such as a fine wire, is allowed to project from its housing when disconnected from the indicator head it becomes bent or twisted and the ordinary laborer installing the equipment on the automobile will not take the trouble to straighten the wire and attach it to the indicator head. To solve this condition, I have developed the present invention in order that on the assembly line of automobiles where the laborer must make a quick but accurate application all that is necessary by my invention is to slide the guide tube into the split collar of the indicator head until the actuating piston comes in contact with the end of the indicator rack with the float in the tank on the bottom of the tank and the indicator dial registering zero. By a turn of the clamping nut the parts are clamped together and the task is quickly and accurately completed. There is no danger of the wire being tampered with or injured because even in the uppermost position of the float nothing projects outside of the guide tube.

Referring to the drawings:

Fig. 1 is an elevation of the complete equipment, with a portion of the housing broken away to show the wire.

Fig. 2 is a front elevation of the face of the indicator head.

Fig. 3 is a section on the line 3—3 of Fig. 2 through the indicator head and the attaching devices of the actuating means with the indicator.

Fig. 4 is a section on the line 4—4 of Fig. 3 illustrating in detail the rack and pinion construction of the indicator head.

Fig. 5 is an enlarged view of the split clamping collar carried by the indicator head.

Fig. 6 is a section through a modified form of indicator head and connecting devices.

Fig. 7 is a section on the line 7—7 of Fig. 6.

Fig. 8 is a section on the line 8—8 of Fig. 3.

Referring to the drawings in detail:

1 is a float of cork or similar material pivoted at 2 upon a float arm 3, which is mounted on one end of a bell crank 4. This bell crank is pivoted at 5 to a suspending bracket 6. The other end of the bell crank slidingly engages at 7 with a lever 8, which is also pivoted on the bracket 6, as at 9. This bracket 6 is suspended from a tank plate 10. The upper end of the lever 8 projects into a housing mounted on the tank plate, which housing is designated 11. The end of the wire 12 is connected to the upper end of this lever 8, as at 13. To the housing is connected the outside flexible casing 14 and the inside flexible casing 15. These casings are to both guide and protect the wire 12 which constitutes the communicating means between the tank and the indicator. This wire is very flexible, but very strong, and fits relatively closely within the inside casing 15.

The indicator end 16 of this outside casing 14 extends into a guide tube 17 which projects beyond the end of the outside casing 14, a distance sufficient for the following purpose. A guiding link 18 is connected at 19 to the wire 12. The connection between the link 18 and the pin 40 of the shaft 25 is a loose connection through the aperture 20 of the link 18. The parts are kept in engagement due to the fact that when the float is in zero position the end of the link 18 will abut against the plate 24 and as the float rises the spring 39 will expand as the wire 12 continues to keep the link 18 against the plate 24, due to the pressure of the spring 39. The total movement of the wire and the link from empty to full position will not be sufficient to project the end of the link beyond the actuating tube so that it is never possible for the link or the wire to become twisted, mashed, or damaged, as both elements are always protected by either the guide tube or the flexible casings.

In Fig. 3 the parts are shown in full tank position. Before attachment to the indicator head the operator may, if he so desires, insert a wire hook into the opening 20 of the actuating link head, and by moving the link and wire can tell by the wire and the sound whether the float is resting on the bottom of the tank when the link is in its fully retreated position, as in Fig. 3. Having ascertained this condition, the next step is for the operator to insert the guide tube 17 within the split tube or collar 21, at the end of the guide tube. A number of slots 22 are cut in the end of this split tube to permit it to be collared on the guide tube and clamped thereon. A collar threaded on the guide tube, such as 23, serves the purpose of clamping the split tube upon the guide tube. The extent to which the guide tube is necessarily inserted in the split tube is determined by the actuating link head coming in contact with the head 24 of the actuating rack 25, when the dial 26 of the indicator head is registering zero and when the float in the tank is on the floor of the tank. At such a time the indicator will register zero and the left hand end of the actuating link will be in engagement with the actuating head 24. When in full position the link will abut the tube 15. The parts can then be clamped together.

The actuating rack 25 is guided at one end by the head 24 welded thereon and riding in the tubes 17 and the other end by a lip 27, which is formed in the supporting yoke 28 which is carried by the bolt 29 within the indicator housing 30. The medial position of the rack 25 passes through and is guided by the walls with apertures 31 in the yoke 28. The arms of this yoke support freely the ends of a shaft 32 upon which is mounted a pinion 33 engaging with the rack teeth 34 and rotated thereby.

This results in rotating the shaft 32 and with it the drum 26 of the indicator which is fixed thereon. Numerals appear on the face of the drum as at 34ª, which are visible to the observer through the observation opening 35 in a plate 36 beneath the glass 37, which is carried by a ring 38, which is threaded in the indicator housing 30.

A helical spring 39 is mounted upon the rack 25 with one end engaging the head 24 and the other end the yoke 28 so that this spring constantly resists the return of the wire and actuating link to zero position as it is moved thereby by the float and also tends to resist the movement of the indicator to zero position. It serves to keep the end of the rack and the end of the actuating link in engagement with one another. These parts are suitably alined by the end 40 of the rack projecting into the opening 20 of the head of the actuating link.

Turning to the modified form of the indicator head, it will be understood that the action is similar save that the supporting yoke 28 is eliminated. The housing 30 is provided with depressed portions 41 and 42 in which the ends of the shaft 32 are journaled. A guiding lip 43 is struck-up in the casing for guiding the end of the rack 25 which is provided with a head 24. A guiding collar 45 is inserted in the split tube 21 for further guiding the rack 25. This construction is somewhat cheaper than the previous construction and is adaptable to certain types of automobiles.

The indicator head itself is attached to the dash board of an automobile, for instance, by the usual U-clamp 46 carried on the bolts 47.

It will be understood that I desire to comprehend within my invention such modifications as may be fairly embraced within it, and as may be found necessary in adapting it to various conditions in the art in the course of the application of the invention.

Having thus fully described my invention, what I claim as new and desire to secure by Letters Patent, is:—

1. In a gauge equipment, a tank, an indicator having actuating means including a head, means in said tank responsive to the liquid level therein for controlling said indicator, a communicating means between said controlling means and said indicator actuating means, means to protect said communicating means so that it is unexposed, means arranged to telescopically receive the said protecting means, said indicator actuating means being adapted to project within said communicating protecting means and engage the end of the communicating means for actuation thereby, and means to yieldingly resist the return of said indicator actuating means to position to register zero, said communicating means having a link on one end thereof, adapted to travel in the end of the protecting means for engagement with the head of the indicator actuating means.

2. In a gauge equipment, a tank, an indicator having actuating means including a rack with a head at one end, means in said tank responsive to the liquid level therein for controlling said indicator, a communicating means between said controlling means and said indicator actuating means, means to protect said communicating means so that it is unexposed, means arranged to telescopically receive said protecting means, said indicator actuating means being adapted to project within said communicating protecting means and engage the end of the communicating means for actuation thereby, means to yieldingly return said indicator actuating means to position to register zero, said communicating means having a link on one end thereof, adapted to travel in the end of the protecting means for engagement with the head of the indicator actuating means, and means for clamping said communicating protecting means and said protecting means for the indicator actuating means to one another, said indicator consisting of an open ended housing and indicating drum with means in said housing for supporting the drum, means to close the open end of the housing and constructed to expose a portion of said drum through the indicator housing to permit the reading of the indication, said rack including a pinion operatively associated with said drum to effect the actuation of the drum.

3. In a gauge equipment, a tank, actuating means in said tank, a flexible wire connected to said actuating means and adapted to be actuated thereby, a loosely fitting inside guiding means surrounding said wire, a protecting casing around said guiding means, a guide tube attached to the remote end of said protecting casing, the guide tube being of sufficient length to prevent the wire projecting therefrom, an actuating link attached to the end of said wire in the guide tube, said tube being of sufficient length to project beyond the length of the link, an indicator, a housing for said indicator having an extension adapted to receive said guide tube, means carried by said indicator housing and telescopically fitting said tube, an actuator within said housing and operatively associated with the indicator and projecting through the means which telescopes the tube, means mounted within the housing for operatively supporting the actuator, and means for connecting the link to the actuator.

4. In a gauge equipment, a tank, actuating means in said tank, a relatively fine flexible wire connected to said actuating means, a relatively loosely fitting inside guiding means surrounding said wire, a protecting casing around said guiding means, a guide tube attached to the indicator end of said protecting casing, the guide tube being of sufficient length to prevent the wire projecting therefrom, a link attached to the end of said wire in the guide tube, said tube being of sufficient length to project beyond the length of the link, an indicator, a housing for said indicator having an extension adapted to receive said tube, means carried by said indicator housing projecting into said tube for engagement with said actuating link, means to maintain said means carried by the indicator housing in engagement with said link, and means to clamp said extension and guide tube to one another, the end of said inside guiding means which fits into said tube adapted to act as a limiting abutment for the link.

5. In a gauge equipment, a tank, actuating means in said tank, a wire attached to said actuating means, a relatively closely fitting guide tube around said wire, a flexible protecting housing around said guide tube, a stiff protecting tube attached to the indicator end of said housing, said guide tube being projected a portion of its length into the stiff protecting tube, a link attached to the end of said wire traveling in said stiff protecting tube, a casing, indicating mechanism in said casing consisting of a shaft, a drum mounted thereon, a yoke for supporting said shaft, a pinion on said shaft, a rack guided and supported by said yoke, and adapted to engage with the said pinion, the end of said rack projecting out of the casing into the end of a split tube, a split tube, a head on said rack, spring means for moving said rack and drum to position where the indicator will register zero, said head on said rack and a portion of the spring means adapted to project into the stiff protecting tube, said stiff protecting tube projecting into said split tube, said head engaging with the link aforementioned, and means for clamping said stiff protecting tube and said split tube to one another.

In testimony whereof, I affix my signature.

EDWARD V. RIPPINGILLE.